(12) United States Patent
Franklin

(10) Patent No.: US 12,171,377 B2
(45) Date of Patent: Dec. 24, 2024

(54) INSULATED BAG WITH VENTS

(71) Applicant: Arid Delivery Products LLC, Franklin, TN (US)

(72) Inventor: Clayton Franklin, Franklin, TN (US)

(73) Assignee: Arid Delivery Products LLC, Franklin, TN (US)

( * ) Notice: Subject to any disclaimer, the term of this patent is extended or adjusted under 35 U.S.C. 154(b) by 0 days.

(21) Appl. No.: 18/300,651

(22) Filed: Apr. 14, 2023

(65) Prior Publication Data

US 2023/0329489 A1 Oct. 19, 2023

Related U.S. Application Data

(60) Provisional application No. 63/331,346, filed on Apr. 15, 2022.

(51) Int. Cl.
*A47J 47/14* (2006.01)

(52) U.S. Cl.
CPC ..................... *A47J 47/14* (2013.01)

(58) Field of Classification Search
CPC ........................................................ A47J 47/14
USPC .......................................................... 206/545
See application file for complete search history.

(56) References Cited

U.S. PATENT DOCUMENTS

| | | | | |
|---|---|---|---|---|
| 4,541,540 A * | 9/1985 | Gretz | ..................... | A45C 11/20 |
| | | | | 220/555 |
| 4,578,814 A * | 3/1986 | Skamser | ................ | B65D 33/24 |
| | | | | 383/110 |
| 4,806,736 A * | 2/1989 | Schirico | ................ | A47J 47/145 |
| | | | | 219/521 |
| 4,816,646 A * | 3/1989 | Solomon | ............... | A47J 47/145 |
| | | | | 219/202 |
| 4,953,550 A * | 9/1990 | Dunshee | ................... | A61F 7/03 |
| | | | | 383/102 |
| 5,180,075 A * | 1/1993 | Montalbano | ........... | B65D 85/36 |
| | | | | 229/117.29 |
| 5,454,471 A * | 10/1995 | Norvell | ..................... | B32B 5/22 |
| | | | | 126/400 |
| 10,092,137 B1 * | 10/2018 | Nelson | ................ | A47J 41/0083 |
| D835,473 S * | 12/2018 | Jacobsen | ....................... | D7/607 |
| 11,407,579 B2 * | 8/2022 | Munie | ................... | A45C 13/10 |

(Continued)

OTHER PUBLICATIONS

Doordash Store, "Therm-O-Tote." Internet. https://doordashstore.ca/product.aspx?ID=524036&locale=en. Last visited Apr. 14, 2023.

(Continued)

*Primary Examiner* — Jacob K Ackun
(74) *Attorney, Agent, or Firm* — Andrew McAleavey

(57) ABSTRACT

An insulated bag has at least a sidewall and a bottom that include a layer of insulating material and may also have a lid with a layer of insulating material. The lid may be hingedly attached to an upper rear portion of the sidewall. If a lid is included, it may have depending flaps that are sized and positioned to cover the joint or union between the upper sidewall and the lid. The insulated bag has features that allow for the escape of steam and water vapor, including openings positioned across the sidewall. If the sidewall has distinct faces, the openings may be arrayed, e.g., in patterns, across all faces of the sidewall. The insulating material may, e.g., be neoprene foam. The overall construction of the insulated bag may keep food warm while allowing steam and water vapor to escape.

20 Claims, 6 Drawing Sheets

(56) References Cited

U.S. PATENT DOCUMENTS

| | | | | |
|---|---|---|---|---|
| 11,466,921 | B2* | 10/2022 | Sonntag | B65D 81/3897 |
| 2009/0194541 | A1* | 8/2009 | Mayo | A45C 13/02 |
| | | | | 383/42 |
| 2012/0321226 | A1* | 12/2012 | Hansen | B65D 25/04 |
| | | | | 383/104 |
| 2019/0000255 | A1* | 1/2019 | Dehner | G08B 13/19695 |
| 2019/0382185 | A1* | 12/2019 | Mogil | A45C 13/008 |
| 2020/0120958 | A1* | 4/2020 | Wu | F24F 13/22 |
| 2020/0138239 | A1* | 5/2020 | Gromowski | A47J 36/2494 |
| 2020/0229645 | A1* | 7/2020 | Karsten | A47J 47/145 |
| 2020/0245735 | A1* | 8/2020 | Sitnikova | A45C 7/0077 |
| 2021/0059367 | A1* | 3/2021 | Daily | A45C 3/06 |
| 2021/0123654 | A1* | 4/2021 | Dahnken | F25D 3/08 |
| 2021/0139200 | A1* | 5/2021 | O'Hara | B65D 81/18 |
| 2021/0188494 | A1* | 6/2021 | Stephens | B65D 25/14 |
| 2021/0309444 | A1* | 10/2021 | Yang | B65D 33/2508 |
| 2023/0046374 | A1* | 2/2023 | Fisher | A45C 7/0068 |
| 2023/0146567 | A1* | 5/2023 | Green | B60R 7/043 |
| | | | | 224/400 |

OTHER PUBLICATIONS

Grubhub, "Eco-Friendly Insulated Starter Bag With PEVA Lining (18×18.5×8.5)." Internet. https://grubhubdrivershop.com/collections/shop-all/products/orange-recycled-deluxe-starter-bags-with-peva-lining?variant=42075100512419. Last visited Apr. 14, 2023.

Webstaurant Store, "American Metalcraft PBSB1512 Standard Red Nylon Sandwich/Take-Out Delivery Bag," Internet. https://www.webstaurantstore.com/american-metalcraft-pbsb1512-15-x-9-x-12-red-deluxe-insulated-nylon-sandwich-delivery-bag/124PBSB1512.html. Last visited Apr. 14, 2023.

* cited by examiner

INSULATED BAG WITH VENTS

CROSS-REFERENCE TO RELATED APPLICATIONS

This application claims priority to, and the benefit of, U.S. Provisional Patent Application No. 63/331,346, filed Apr. 15, 2022, the contents of which are incorporated by reference herein in their entirety.

TECHNICAL FIELD

The invention relates generally to insulated containers and, more specifically, to an insulated bag with vents.

BACKGROUND

Food delivery in the United States was once a service offered by only a few types of restaurants with dedicated delivery drivers. Over the last decade, third-party services have sprung up that partner with, and deliver food from, a variety of restaurants. The COVID-19 pandemic intensified the demand for delivery services and further increased the number and types of restaurants willing (or forced) to offer delivery services, as well as the swath of the public willing to consider food delivery.

As more consumers use food delivery on a regular basis, and as the types of delivery food grow, food quality issues caused by delivery have become more noticeable. Although most restaurants and most commercial delivery services provide insulated bags to hold the food during delivery, food can still arrive at its destination cold. Beyond temperature, though, retaining the freshness of delivered food remains a challenge.

BRIEF SUMMARY

One aspect of the invention relates to an insulated bag. The insulated bag has at least a sidewall and a bottom that include a layer of insulating material and may also have a lid with a layer of insulating material. In some embodiments, the lid may be hingedly attached to an upper rear portion of the sidewall. If a lid is included, it may have depending flaps that are sized and positioned to cover the joint or union between the upper sidewall and the lid. The insulated bag has features that allow for the escape of steam and water vapor, including openings positioned across the sidewall. If the sidewall has distinct faces, the openings may be arrayed, e.g., in patterns, across all faces of the sidewall. The insulating material may, e.g., be neoprene foam. The insulated bag may keep food warm during delivery while allowing steam and water vapor to escape.

Other aspects, features, and advantages of the invention will be set forth in the description that follows.

BRIEF DESCRIPTION OF THE DRAWING FIGURES

The invention will be described with respect to the following drawing figures, in which.

DETAILED DESCRIPTION

Figure 1:
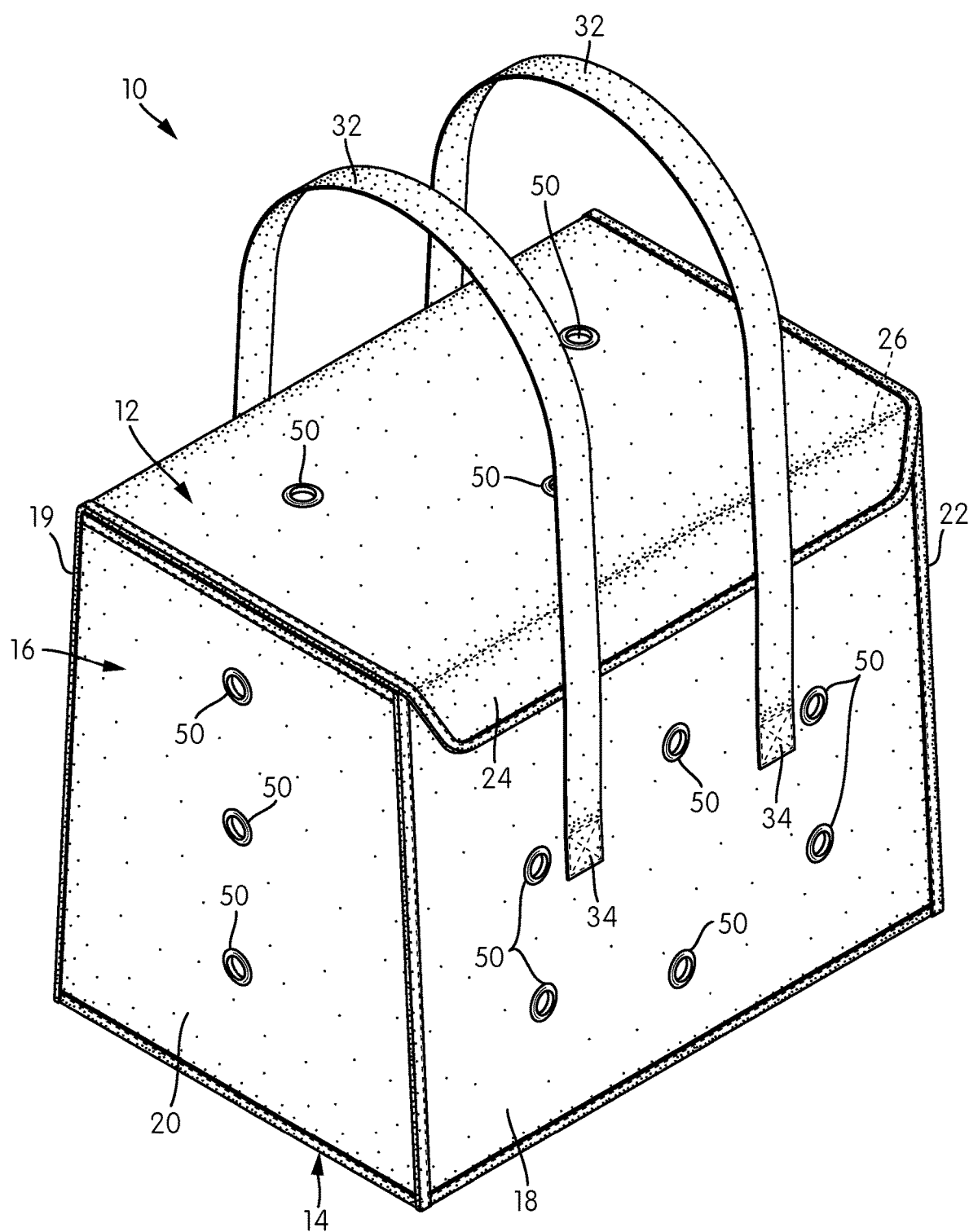
FIG. 1 is a perspective view of an insulated bag according to one embodiment of the invention, shown with the lid closed.

FIG. 1 is a perspective view of an insulated bag, generally indicated at 10, according to one embodiment of the invention, shown with its lid 12 in the closed and secured position. The insulated bag 10 is a reusable bag that can be put to a number of uses but may be particularly useful in holding food during restaurant food deliveries.

In the illustrated embodiment, the insulated bag has the general shape of a soft, slightly trapezoidal prism, with a bottom 14, a sidewall 16, and the lid 12. The sidewall 14 includes long, equal front and back sides 18, 19 and shorter left and right sides 20, 22. (Here, terms like "left" and "right" are used with respect to the coordinate system of the figures.). As can be seen in FIG. 1, the left and right sides 20, 22 are trapezoidal in this embodiment, with broader bases than tops, while the front and back sides 18, 19 are rectangular.

The lid 12 is permanently hingedly connected to the back side 19 of the sidewall 16 and has a front hinged, depending flap 24 that comes down over the front side 18 to close the bag 10. The hinge 26 for the front flap in the illustrated embodiment is defined by a stitch line; other hinges may be similarly defined, or the material of the lid 12 may simply be bent in appropriate places. For example, if the lid 12 has an inner layer of insulation, that layer of insulation may be incised or scored across much of its width in order to facilitate bending and hinged movement.

Figure 2:
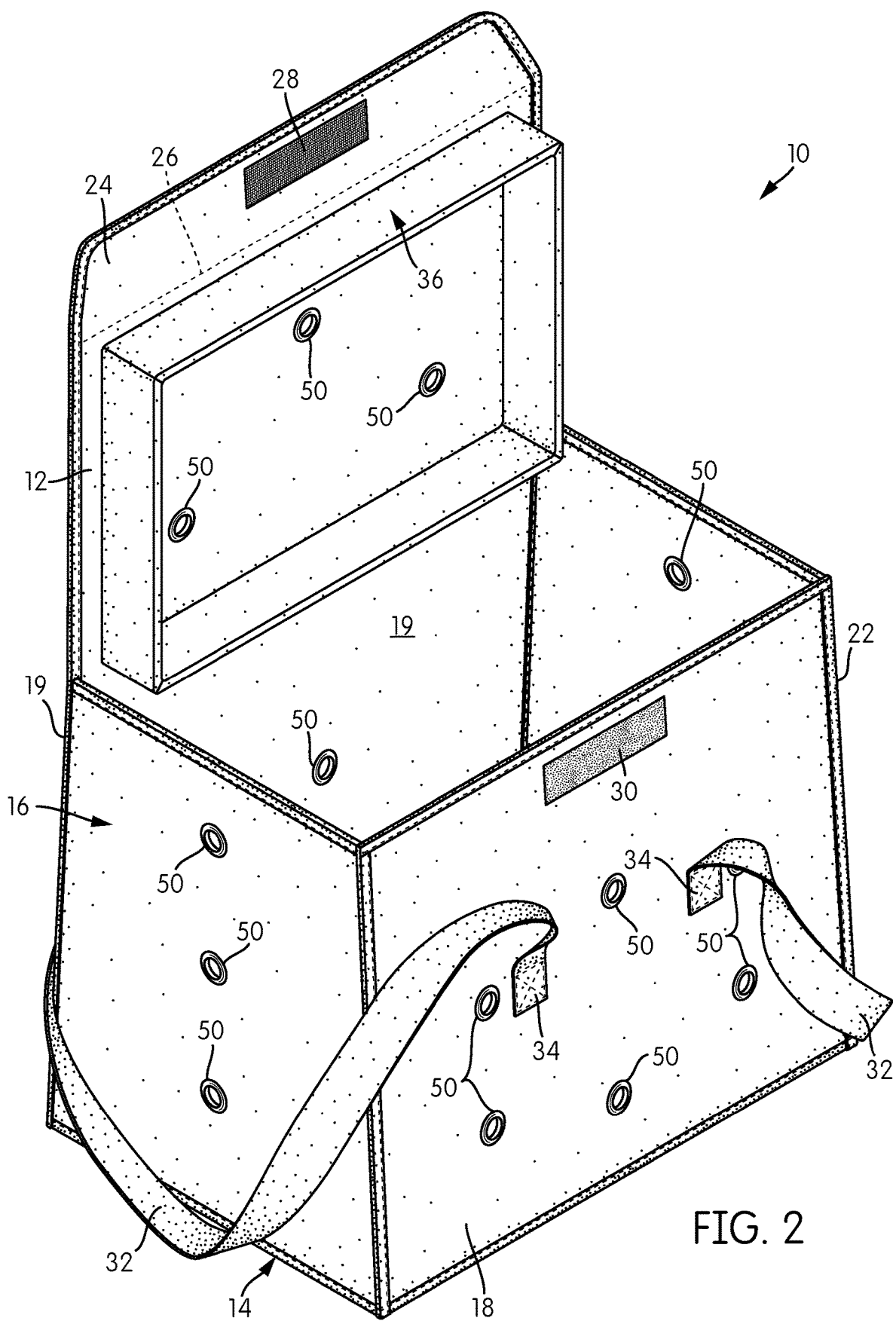
FIG. 2 is a perspective view of the insulated bag, shown with the lid open.

FIG. 2 is a perspective view of the bag 10 with the lid 12 open. On the underside of the front flap, a section or sections of hook-and-loop fastener 28 are placed, with complementary sections of hook-and-loop fastener 30 positioned on the upper front sidewall 18 to secure the front flap 24. A pair of straps 32 extends from back to front, attaching on the back panel and the front panel by, e.g., box stitching 34. The orientation and length of the straps 32 is such that they can be pushed to the sides in order to open or close the lid. FIG. 2 shows an operational position of the straps, pulled upwardly so that they can be grasped, while FIG. 1 shows the position of the straps 32 when they are pushed to the sides to allow access to the lid 12 and the interior of the bag 10.

The straps 32 may be made from a variety of materials. In the illustrated embodiment, the straps 32 may be, e.g., flat webbing cord, or rope, such as flat nylon webbing. In general, the straps 32 may be extensible or inextensible. If extensible, the straps 32 may be made of or comprise an elastic material. Additional structure may be provided to act as a joining handle for the two straps 32.

In order to reduce heat loss around the lid 12, as shown in FIG. 2, the underside of the lid 12 includes a four-sided set of depending insulative flaps, generally indicated at 36, one flap for each side, the set of flaps 36 positioned toward the perimeter of the lid 12. The flaps are generally 2-3 inches long, long enough to cover at least the junction between the lid 12 and the sidewall 16.

Figure 3:
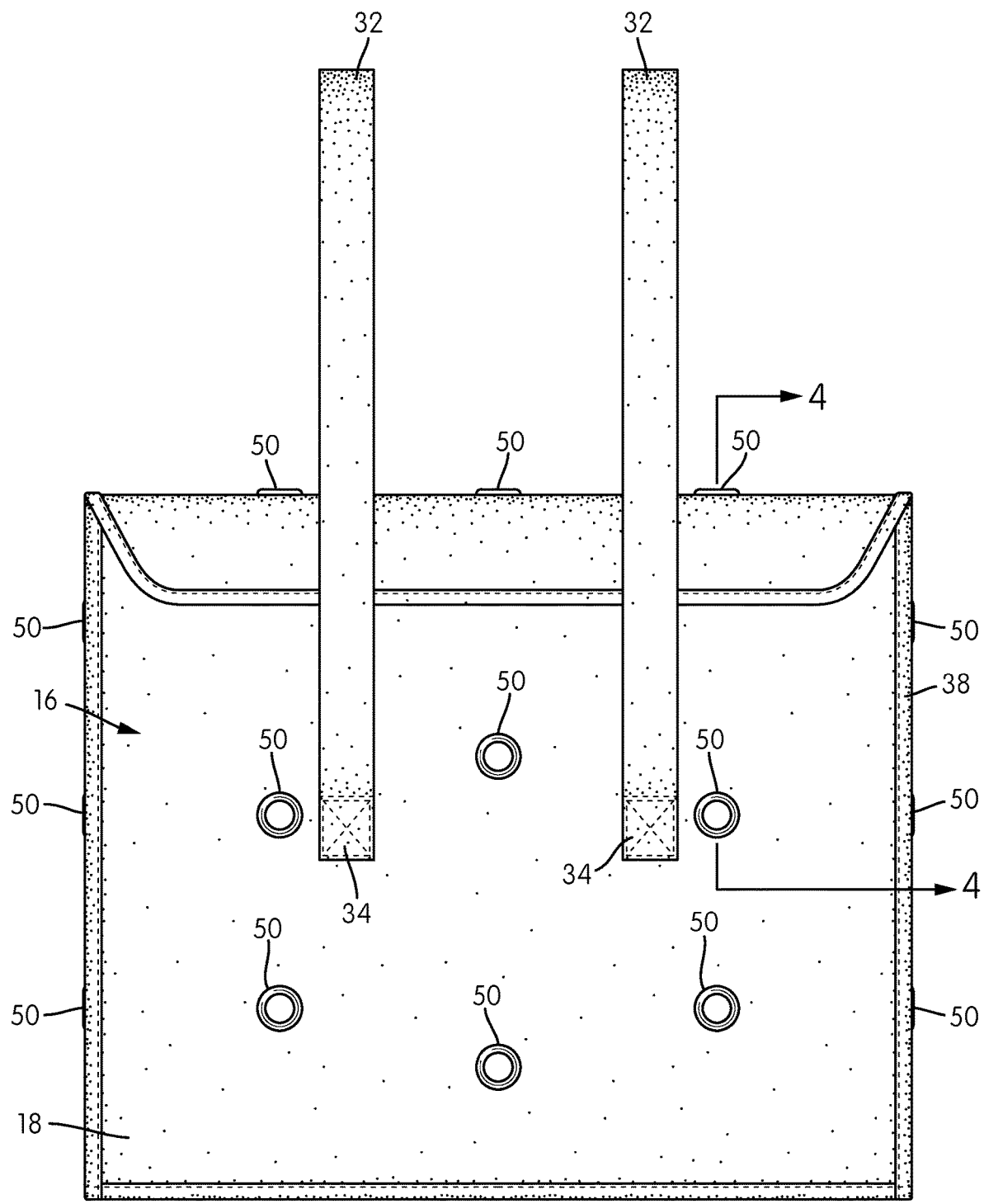
FIG. 3 is a front elevational view.
Figure 4:
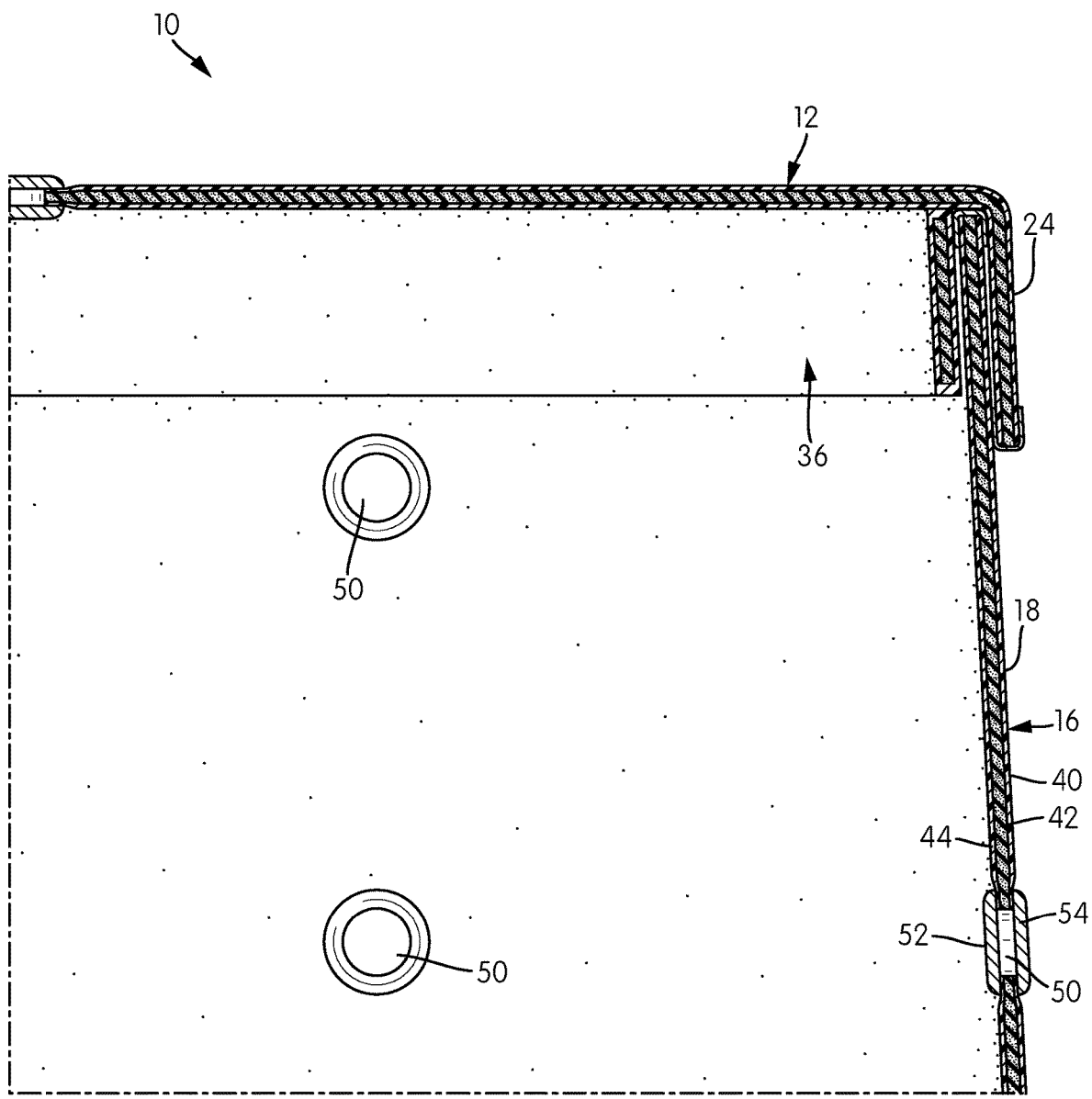
FIG. 4 is a cross-sectional view taken through Line 4-4 of FIG. 3.

FIG. 3 is a front elevational view of the bag 10, and FIG. 4 is a cross-sectional view taken through Line 4-4 of FIG. 3. The insulated bag 10 of the illustrated embodiment is constructed by stitching panels together at defined seams. The seams may be protected by piping 38, as shown in FIGS. 1-3. Unjoined edges, like the forward edge of the flap 24, may also be protected by similar piping 38.

In the cross-section of FIG. 4, the extent of the set of flaps 36 relative to the joint between the lid 24 and sidewall 16 can be appreciated. The construction of the bag 16 can also be appreciated. The sidewall 18 and bottom 14 are of a three-layer construction: an outer layer of material 40, an inner insulating layer 42, and an inner lining 44. The inner lining 44 may be a fabric, such as a woven nylon. The outer layer of material 40 may also be a fabric, a plastic sheet, a coated fabric, etc. Preferably, the outer layer of material 40 offers at least some resistance to rain, snow, and other elements. The inner lining 44, for its part, is preferably resistant to the buildup of steam and water vapor, has at least some permeability, and has at least some ability to retain heat.

In the illustrated embodiment, the three layers of material 40, 42, 44 are only joined at the seams; they are not quilted together, although that could be the case in other embodiments. While stitching is used in the illustrated embodiment, in other embodiments, adhesives, thermal fusing, or other means of connection may be used.

Although FIG. 4 does not illustrate the hinge area connecting the rear side 19 to the lid 12, as was noted briefly above, in that region, the inner insulating layer 42 may be cut through across most of its width, excluding, e.g., a 1-2 inch (2.5-5 cm) length on each side to maintain integrity, in order to facilitate bending.

The general form of the insulated bag 10 may vary considerably from embodiment to embodiment. In this embodiment, as will be described below in more detail, the bottom, sidewall, and lid have sufficient rigidity such that, while the insulated bag is relatively soft and compressible, it largely holds its shape against gravity. Although that need not be the case in all embodiments, if an insulated bag 10 does generally hold its shape, it may be faster and easier to place food in it and to remove food from it. Modifications are possible. For example, in other embodiments, an insulated bag may use a zippered closure. Other strap orientations and types are also possible.

While the insulated bag 10 of FIG. 1 has a generally trapezoidal overall shape, some variation may be helpful. For example, in a more rectilinear embodiment, the front and rear panels of the sidewall may be 11-inch (27.9 cm) by 14-inch (35.6 cm) rectangular panels, and the bottom may be an 8-inch (20.3 cm) by 14-inch (35.6 cm) rectangle. However, a trapezoidal embodiment may have a 6-inch (15.2 cm) top side, an 8-inch (20.3 cm) bottom side or base, and a side length of 11 inches (27.9 cm). The use of trapezoidal side panels with broader lower bases makes the base of the insulated bag 10 broader than its top, and may provide more stability, as well as more space for food containers on the bottom.

Larger dimensions are also possible. For example, in another embodiment, the front and rear sides 18, 19 may be 16 by 13 inches (40.6 by 33.0 cm), the side panels 20, 22 may be 11 inches (27.9 cm) at the bottom and 9 inches (22.9 cm) at the top with a height of 13 inches (33.0 cm), and the lid 12 may have dimensions of 16 inches by 25 inches (40.6 cm by 63.5 cm). As can be appreciated from FIGS. 1-3, the flap 24 of the lid 12 may be rounded at its corners, removing about 2 inches of material from each side.

The present inventor has found that two factors are particularly relevant to the perception of freshness with delivery food: temperature and moisture. As to temperature, it is advantageous if delivered food arrives as hot as possible relative to its original temperature. The effect of moisture is somewhat more complex. Many dishes are packed and placed in a bag for delivery while steaming hot. Most food containers used in delivery make enough of a seal to prevent gross leakage of food but are not sealed tightly enough to prevent the escape of all steam and water vapor. Thus, during delivery, some steam and water vapor escapes the food containers and enters the bag. The insulating effect of the bag 10 may prevent at least some of the heat carried by the steam and water vapor from leaving the bag 10, which may be beneficial in keeping the food hot. However, the moisture buildup may have deleterious effects on the food. For example, the lingering moisture may condense and re-wet food, causing particular problems for baked and fried foods. The condensed moisture in the bag 10 can also present a sanitary and cleaning issue for the bag 10 itself.

For these reasons, the insulated bag has features that allow it to keep its contents warm while offering moisture, such as steam and water vapor, the opportunity to leave the bag or, at least, to be sequestered away from the food. Specifically, each face of the insulated bag has a pattern of openings 50. Each individual opening 50 is small, relative to the sidewall and its faces, generally too small for much heat to be lost by convection or radiation, but each opening 50 allows for the escape of steam and water vapor.

In the illustrated embodiment, each individual opening 50 is a 0.5" (13 mm) diameter grommeted opening. As can be seen in FIG. 4, one half 52 of the grommet is installed along the interior and the other half 54 along the exterior. The grommets 52, 54 secure the opening 50 and prevent tearing of the insulated bag 10 or its layers 40, 42, 44 at the opening. Of course, a grommet 52, 54 is only one way in which an opening 50 may be secured. In other cases, stitching may be used, the layers 40, 42, 44 may be fused together at the opening, or other suitable means may be used.

Figure 5:
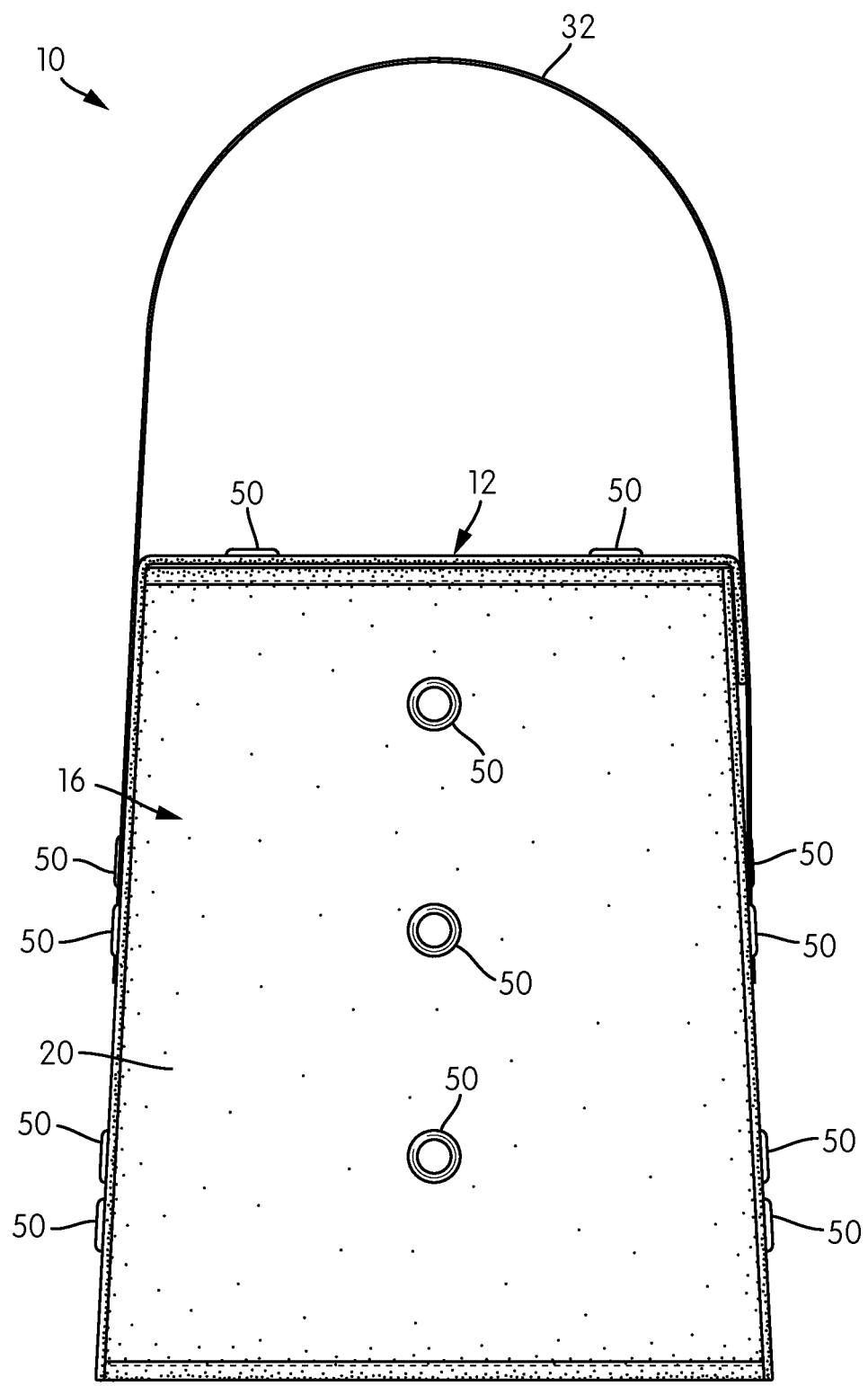
FIG. 5 is a side elevational view.
Figure 6:
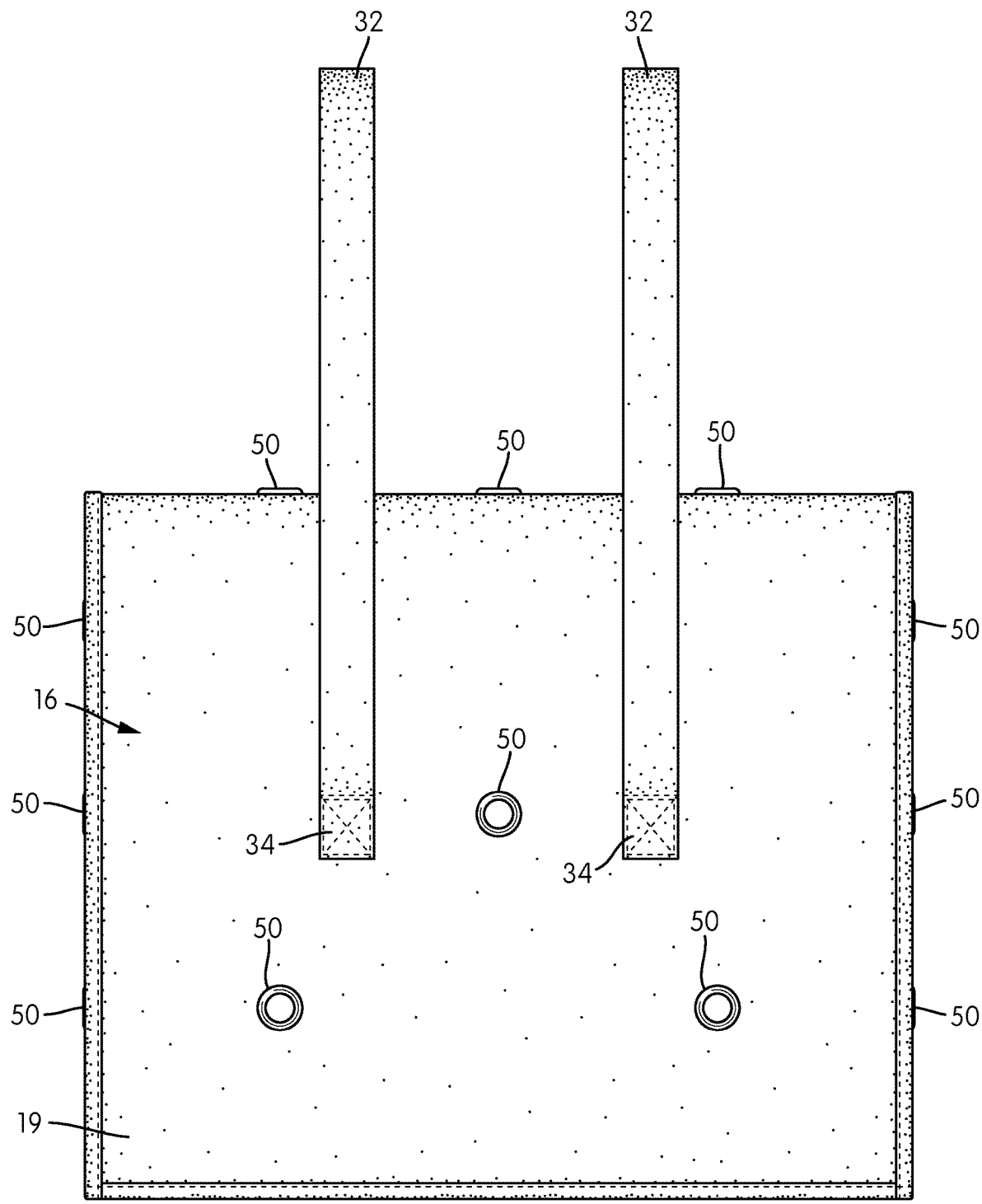
FIG. 6 is a rear elevational view.

The pattern of openings 50 varies by the face of the insulated bag. As shown in FIGS. 1-3, the front sidewall has six grommeted openings arranged in a pattern spaced over much of the central portion of the front sidewall. In the illustrated embodiment, the grommets 52, 54 are arranged hexagonally, but they could be arranged in linear rows, or in some other pattern. The lid 12 has a pattern of three openings arranged in a triangular shape. The sides 20, 22 each have a vertical row of three openings 50, as can be seen in FIGS. 1 and 2, as well as in FIG. 5, a side elevational view of the insulated bag 10. (The two sides are mirror images of one another.) FIG. 6 is a rear elevational view of the insulated bag 10, illustrating the three openings 50 on that panel, in this case, arranged in a triangular pattern.

The number and placement of openings may vary from embodiment to embodiment. In some cases, openings may be placed in the bottom of the insulated bag as well, although this has the disadvantage that, if food is spilled within the insulated bag, the insulated bag may not be able to contain it.

The inner insulating layer 42 may be a polymer foam, foam rubber, slab or sheet rubber, natural fiber batting, synthetic polymer fiber batting, or any other material capable of providing thermal insulation. Polymer foams and foam rubbers may be particularly useful as thermal insulation. In one embodiment, the inner lining 44 may be nylon fabric, the inner insulating layer 42 may be a neoprene foam rubber, and the outer layer 44 may be a vinyl, such as a marine vinyl. The thicknesses of the various layers will vary from embodiment to embodiment. For example, the layer of thermal insulation may be from about one-eighth inch (3.2 mm) to about one-half inch (12.7 mm) thick. Typically, the layer of thermal insulation will be much thicker than the inner and outer linings. The set of flaps 36 may have the material of the inner lining as an inner and an outer layer.

While portions of this description may reference steam and water vapor leaving or escaping the insulated bag, that need not always be the case. Although some steam and water vapor are likely to leave the insulated bag through its openings, it may be sufficient that the steam and water vapor are sequestered or condense away from the food items.

EXAMPLES

Example 1: An Insulated Bag According to an Embodiment of the Present Invention

An insulated bag was constructed as described above using a marine vinyl exterior layer, 420 denier coated nylon pack cloth as an interior layer, and one-eighth inch (3.2 mm) neoprene foam (Lazy Dog Warehouse via Amazon.com, United States) as a core insulating layer between the exterior layer and the interior layer or lining. The insulated bag was sewn with conventional stitching at its seams. The insulated bag had a width of 14 inches (355.6 mm), a height of 11 inches (279.4 mm), and trapezoidal side panels that varied the depth of the bag between 6 inches (152.4 mm) at the top and 8 inches (203.2 mm) at the bottom. The insulated bag had one-half inch (12.7 mm) grommeted openings in the pattern of FIGS. 1-4 on all sides except for the bottom. The lid of the insulated bag included the depending insulative flaps shown in FIG. 1.

The constructed insulated bag was used in 11 separate deliveries of hot, prepared food items, in simulation of commercial food delivery services. The 11 deliveries involved 28 separate food items, including burgers, French fries, chicken nuggets, chicken tenders, and sandwiches. The delivery vehicle was kept at 70° F. (21° C.). Delivery time for each delivery was recorded in whole minutes. At the time of pickup, the food items were placed in the bag and the bag was weighed with an accuracy of one gram. The bag was weighed again at the time of drop off, before the items were removed from it. A temperature, in degrees Fahrenheit, was recorded for each item in each delivery at pickup and drop off. Temperature change and weight change were calculated as percentages of the original temperature and weight values. The results are summarized below in Table 1.

TABLE 1

Summary Data for Example 1

| 11 Deliveries | Delivery Time (minutes) | Temperature Change (%) | Weight Change (%) |
|---|---|---|---|
| Mean | 16.24 | 0.06 | −0.70 |
| Median | 15.00 | 1.02 | −0.74 |
| Std. Dev. | 6.36 | 8.48 | 0.32 |
| Range | 27.00 | 33.97 | 0.96 |

Comparative Example 2: The GRUBHUB® Insulated Bag

A small GRUBHUB® insulated bag was obtained from the company. As obtained, the GRUBHUB® insulated bag had a 600 denier polyester fiber exterior, a silvered interior lining, and was described as having a 6.5 mm (0.26 in) poly(ethylene-vinyl acetate) (PEVA) foam lining. The GRUBHUB® bag was used in 11 separate deliveries of hot, prepared food items, simulating commercial food deliveries. The 11 deliveries involved 21 separate food items, including burgers, French fries, chicken, and other entrees. The delivery vehicle was kept at 70° F. (21° C.). Delivery time for each delivery was recorded in whole minutes. At the time of pickup, the food items were placed in the bag and the bag was weighed with an accuracy of one gram. The bag was weighed again at the time of drop off before the items were removed from it. A temperature, in degrees Fahrenheit, was recorded for each item in each delivery at pickup and drop off. Temperature change and weight change were calculated as percentages of the original temperature and weight values. The results are summarized below in Table 2.

TABLE 2

Summary Data for Comparative Example 2.

| 11 Deliveries | Delivery Time (minutes) | Temperature Change (%) | Weight Change (%) |
|---|---|---|---|
| Mean | 17.14 | −16.86 | 2.05 |
| Median | 17 | −14.84 | 1.30 |
| Std. Dev. | 2.80 | 10.68 | 3.97 |
| Range | 9 | 36.07 | 12.36 |

Comparative Example 3: A DOORDASH® Insulated Tote Bag

A DOORDASH® "THERM-O-TOTE" tote insulated bag (No. DDH023C) was obtained from the company. The bag was advertised as having a nonwoven exterior with an insulated foil lining of "hot air cotton." The DOORDASH® bag was used in 18 separate deliveries of hot, prepared food items, simulating commercial delivery. The 18 deliveries involved 40 separate food items, including burgers, French fries, chicken, and other entrees. The delivery vehicle was kept at 70° F. (21° C.). Delivery time for each delivery was recorded in whole minutes. At the time of pickup, the food items were placed in the bag and the bag was weighed with an accuracy of one gram. The bag was weighed again at the time of drop off before the items were removed from it. A temperature, in degrees Fahrenheit, was recorded for each item in each delivery at pickup and drop off. Temperature change and weight change were calculated as percentages of the original temperature and weight values. The results are summarized below in Table 3.

TABLE 3

Summary Data for Comparative Example 3.

| 18 Deliveries | Delivery Time (minutes) | Temperature Change (%) | Weight Change (%) |
|---|---|---|---|
| Mean | 17.51 | −15.66 | 1.95 |
| Median | 18 | −15.98 | 0.65 |
| Std. Dev. | 5.92 | 9.79 | 3.88 |
| Range | 24 | 33.38 | 16.03 |

Comparative Example 4: An American Metalcraft Insulated Tote Bag

An American Metalcraft sandwich tote insulated bag (no. PBSB1512) was obtained from American Metalcraft, Inc. of Franklin Park, Illinois, United States. The bag was advertised as having PVC foam insulation with nylon interior and exterior and "nine tiny grommet holes [to] minimize condensation accumulation." The bag was used in 18 separate deliveries of hot, prepared food items, arranged by a third-party commercial food delivery service. The 20 deliveries involved 29 separate food items, including burgers, French fries, chicken, breakfast sandwiches, and other entrees. The delivery vehicle was kept at 70° F. (21° C.). Delivery time for each delivery was recorded in whole minutes. At the time of pickup, the food items were placed in the bag and the bag was weighed with an accuracy of a tenth of a gram. The bag was weighed again at the time of drop off before the items were removed from it. A temperature, in degrees Fahrenheit, was recorded for each item in each delivery at pickup and drop off. Temperature change and weight change were calculated as percentages of the original temperature and weight values. The results are summarized below in Table 4.

TABLE 4

Summary Data for Comparative Example 4.

| 20 Deliveries | Delivery Time (minutes) | Temperature Change (%) | Weight Change (%) |
|---|---|---|---|
| Mean | 17.83 | −15.52 | 1.02 |
| Median | 18.00 | −17.61 | 0.41 |
| Std. Dev. | 12.37 | 11.36 | 2.80 |
| Range | 70 | 41.97 | 12.90 |

Example 5: An Insulated Bag with Thicker Insulation According to Another Embodiment of the Invention An insulated bag was constructed as described in Example 1, using the same materials and with the same features, with the exception that the interior insulation was one-quarter inch (6.35 mm) thick neoprene foam instead of the one-eighth inch (3.2 mm) neoprene foam used in Example 1. The bag was used in 9 separate deliveries of hot, prepared food items, arranged by a third-party commercial food delivery service. The 9 deliveries involved 19 separate food items, including burgers, French fries, chicken, and other entrees. The delivery vehicle was kept at 70° F. (21° C.). Delivery time for each delivery was recorded in whole minutes. At the time of pickup, the food items were placed in the bag and the bag was weighed with an accuracy of one gram. The bag was weighed again at the time of drop off before the items were removed from it. A temperature, in degrees Fahrenheit, was recorded for each item in each delivery at pickup and drop off. Temperature change and weight change were calculated as percentages of the original temperature and weight values. The results are summarized below in Table 5.

TABLE 5

Summary data for Example 5.

| 9 Deliveries | Delivery Time (minutes) | Temperature Change (%) | Weight Change (%) |
|---|---|---|---|
| Mean | 19.5 | −10.63 | −0.96 |
| Median | 17.5 | −8.26 | −0.70 |
| Std. Dev. | 9.13 | 10.94 | 1.35% |
| Range | 22 | 38.84 | 3.85% |

DISCUSSION

In general, the insulated bag according to an embodiment of the present invention (Example 1), showed much lower mean temperature drop than did any of the bags in the comparative examples. Example 1 was the only example to show a loss in weight, meaning that, on average, some mass, presumably steam and water vapor, was lost to the outside during the delivery process. Example 1 and the comparative examples all showed great range in temperature change, indicating that in any set of deliveries, there are some "outliers" that lose heat faster than other items. However, as indicated by the standard deviation of temperature change and the range of temperature change, the insulated bag of Example 1 had among the lowest variability of any of the insulated bags that were tested. Overall, the insulated bag of Example 1 was much better at keeping food hot than those of the comparative examples, while at the same time, the data shows that mass does escape the insulated bag during delivery.

A comparison of Example 1 with Example 5 shows that while the insulated bags in both of those examples kept food warmer than those of the comparative examples and both bags allowed some mass to escape during delivery, the bag of Example 1, with the thinner insulation, was more effective overall.

This description uses the term "about" to indicate that a stated numerical range or value may vary. In general, when the term "about" is used, it means that the value may vary so long as the result described in the text does not. If it cannot be determined what range of values would not alter the desired result, the term "about" should be interpreted to mean ±10%.

While the invention has been described with respect to certain embodiments, the description is intended to be exemplary, rather than limiting. Modifications and changes may be made within the scope of the invention, which is defined by the appended claims.

What is claimed is:

1. An insulated bag, comprising:
   a sidewall and a bottom, the sidewall and the bottom each including an outer layer, an insulating layer of neoprene foam, and an inner lining;
   a lid arising from the sidewall such that it is hingedly connected thereto, the lid adapted to cover an upper opening defined by the sidewall so as to close the insulated bag, and including a set of insulative flaps depending from an underside of the lid, the set of insulative flaps positioned around the perimeter of the lid and adapted to cover a junction between the lid and the sidewall around the upper opening when the lid is in position to cover the upper opening; and
   a plurality of openings provided along multiple faces of the sidewall.

2. The insulated bag of claim 1, wherein each of the plurality of openings is at least 0.5 inches.

3. The insulated bag of claim 2, wherein each of the plurality of openings is secured by a grommet.

4. The insulated bag of claim 3, wherein the neoprene foam of the insulating layer has a thickness of 0.125-0.5 inches.

5. The insulated bag of claim 4, wherein the outer layer comprises a marine vinyl.

6. The insulated bag of claim 5, wherein the inner layer comprises a nylon fabric.

7. The insulated bag of claim 6, wherein the inner layer comprises nylon pack cloth.

8. The insulated bag of claim 1, wherein the bag has a mean food temperature change and a mean food weight change of less than 1%, given a mean delivery time of 16 minutes, a median delivery time of 15 minutes and a delivery time range of 27 minutes.

9. The insulated bag of claim 1, wherein the neoprene foam of the insulating layer has a thickness of one-eighth inch.

10. An insulated bag, comprising:
a sidewall and a bottom, the sidewall and the bottom each including an outer layer, an insulating layer, and an inner lining;
a lid arising from the sidewall such that it is hingedly connected thereto, the lid adapted to cover an upper opening defined by the sidewall so as to close the insulated bag, and including a set of insulative flaps depending from an underside of the lid, the set of insulative flaps positioned around the perimeter of the lid and adapted to cover a junction between the lid and the sidewall around the upper opening when the lid is in position to cover the upper opening; and
a plurality of grommeted openings provided along multiple faces of the sidewall.

11. The insulated bag of claim 10, wherein the insulating layer comprises neoprene foam having a thickness in the range of about one-eighth inch to about one-half inch.

12. The insulated bag of claim 11, wherein the insulating layer has a thickness of about one-eighth inch.

13. The insulated bag of claim 11, wherein the inner lining comprises a nylon fabric.

14. The insulated bag of claim 13, wherein the outer layer comprises a vinyl.

15. The insulated bag of claim 14, wherein the outer layer comprises a marine vinyl.

16. The insulated bag of claim 10, wherein each of the plurality of grommeted openings is at least 0.5 inches.

17. An insulated bag, comprising:
a sidewall and a bottom, the sidewall and the bottom each including an outer layer of polymer sheet, an insulating layer of neoprene foam having a thickness in the range of about one-eighth inch to about one-half inch, and an inner lining of a woven fabric;
a lid arising from the sidewall such that it is hingedly connected thereto, the lid adapted to cover an upper opening defined by the sidewall so as to close the insulated bag, and including a set of insulative flaps depending from an underside of the lid, the set of insulative flaps positioned and adapted to cover a junction between the lid and the sidewall around the upper opening when the lid is in position to cover the upper opening; and
a plurality of grommeted openings provided along multiple faces of the sidewall.

18. The insulated bag of claim 17, wherein the outer layer of polymer sheet comprises a layer of marine vinyl.

19. The insulated bag of claim 18, wherein the inner lining comprises a nylon fabric.

20. The insulated bag of claim 17, wherein each of the plurality of grommeted openings is 0.5 inches.

* * * * *